United States Patent
Smith et al.

(10) Patent No.: US 11,166,217 B2
(45) Date of Patent: Nov. 2, 2021

(54) HANDOFF ASSISTANCE ACROSS MULTIPLE RADIO ACCESS TECHNOLOGIES

(71) Applicant: Cisco Technology, Inc., San Jose, CA (US)

(72) Inventors: Malcolm M. Smith, Richardson, TX (US); Jerome Henry, Pittsboro, NC (US); Vishal S. Desai, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 79 days.

(21) Appl. No.: 16/601,363

(22) Filed: Oct. 14, 2019

(65) Prior Publication Data

US 2021/0112472 A1 Apr. 15, 2021

(51) Int. Cl.
*H04W 36/30* (2009.01)
*H04B 17/318* (2015.01)
(Continued)

(52) U.S. Cl.
CPC .......... *H04W 36/30* (2013.01); *H04B 17/318* (2015.01); *H04W 36/0022* (2013.01);
(Continued)

(58) Field of Classification Search
CPC ........... H04W 36/30; H04W 36/00837; H04W 36/08; H04W 36/0058; H04W 36/0022; H04B 17/318
See application file for complete search history.

(56) References Cited

U.S. PATENT DOCUMENTS 9,832,808 B2  11/2017  Pazhyannur et al.
2008/0096560 A1*  4/2008  Felske ............. H04W 36/00837
                                                    455/436
(Continued)

FOREIGN PATENT DOCUMENTS

WO    2018178293 A1    10/2018

OTHER PUBLICATIONS

PCT Notification of Transmittal of the International Search Report and the Written Opinion of the International Searching Authority, or the Declaration for Application No. PCT/US2020/055059 dated Jan. 14, 2021.

(Continued)

*Primary Examiner* — Farid Seyedvosoghi
(74) *Attorney, Agent, or Firm* — Patterson + Shendan, LLP (57) ABSTRACT

Handoff assistance across multiple radio access technologies can be provided by identifying a first Qualitative Level of Service (QLoS) of a first network that a User Equipment (UE) is connected to for data transmission; identifying a second QLoS of a second network that the UE is not connected to for data transmission; and in response to determining that a difference between the first QLoS and the second QLoS satisfies a handoff threshold, requesting a first access point in the first network to initiate handoff of the UE to a second access point in the second network or recommending from the first access point to the UE to request such a handoff, wherein handoff disconnects the UE from the first network for data transmission and connects the UE to the second network for data transmission.

16 Claims, 6 Drawing Sheets

(51) Int. Cl.
*H04W 36/00* (2009.01)
*H04W 36/08* (2009.01)

(52) U.S. Cl.
CPC . *H04W 36/0058* (2018.08); *H04W 36/00837* (2018.08); *H04W 36/08* (2013.01)

(56) References Cited

U.S. PATENT DOCUMENTS

| | | |
|---|---|---|
| 2011/0201336 A1 | 8/2011 | Garrett et al. |
| 2012/0115487 A1* | 5/2012 | Josso ............... H04W 36/30 455/437 |
| 2017/0201890 A1* | 7/2017 | Laselva ............. H04W 48/00 |
| 2017/0359737 A1* | 12/2017 | Singh ............... H04W 16/14 |
| 2018/0368047 A1 | 12/2018 | Patil et al. |
| 2019/0028946 A1 | 1/2019 | Gandhi et al. |
| 2019/0124543 A1 | 4/2019 | Grayson et al. |
| 2019/0200283 A1 | 6/2019 | Graybeal et al. |
| 2020/0029260 A1* | 1/2020 | Kadiri ............... H04W 36/026 |

OTHER PUBLICATIONS

3rd Generation Partnership Project; Technical Specification Group Services and System Aspects; Architecture enhancements for non-3GPP accesses (Release 16), 3GPP Standard; Technical Specification; 3GPP TS 23.402, 3rd Generation Partnership Project (3GPP), Sophia-Antipolis Cedex; France, vol. SA WG2, No. V16.0.0, Jun. 11, 2019 (Jun. 11, 2019), pp. 1-314.

LG Electronics Inc: "WLAN measurement framework", 3GPP Draft; R2-154471 WLAN Measurement Framework, 3rd Generation Partnership Project (3GPP), Mobile Competence Centre, vol. RAN WG2, No. Malmo, Sweden; Oct. 5, 2015-Oct. 9, 2015, Oct. 4, 2015.

U.S. Appl. No. 16/130,904 Traffic Steering Between Different Wireless Networks, filed Sep. 13, 2018.

Barton, Robert; Graybeal, John; Brinckman, Bart; Henry, Jerome; and Rosenberg, Catherine, "Service Level Agreement Enforcement and Measurement of Network Slices", Technical Disclosure Commons, (Jun. 20, 2018).

* cited by examiner

HANDOFF ASSISTANCE ACROSS MULTIPLE RADIO ACCESS TECHNOLOGIES

TECHNICAL FIELD

Embodiments presented in this disclosure generally relate to managing the handoff of a device in a wireless communications environment from one network to a second network. Particularly, the present disclosure relates to managing the transition from a first network of a first Radio Access Technology (RAT) type to a second network of a second RAT type.

BACKGROUND

When User Equipment (UE) has access to more than one network, user preferences, software settings, network congestion, and other factors may be used to identify which network will provide communication services with the device. As the UE moves in the environment, the mobile device (or the AP) may determine that a connection between a device and a first AP should transition to a connection with a different AP and the UE. The determination of whether to transition to a new AP is based on the current connection characteristics, such as, for example, the mobile device identifying that a second AP has a stronger or less lossy signal than a first AP

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

One embodiment presented in this disclosure is a method that includes: receiving, at a first Access Point (AP) of a first Radio Access Technology (RAT) type part of a first wireless network, a location of a User Equipment (UE) that is currently connected to the first network; receiving, at the first AP from the UE, the network coverage characteristics for the UE that identify: a first signal strength metric of the first network for the UE; an identity of a second AP part of a second wireless network, to which the UE is not connected, wherein the second AP is a second RAT type different than the first RAT type; and a second signal strength metric of the second network for the UE; determining a first qualitative level of service of the first network for the UE based on the location, the first signal strength metric, and the first RAT type; determining a second qualitative level of service of the second network for the UE based on the location, the second signal strength metric, and the second RAT type; and in response to a difference between the first qualitative level of service and the second qualitative level of service satisfying a threshold, transmitting a handoff recommendation to the UE to disconnect from the first network and connect to the second network.

One embodiment presented in this disclosure is a method that includes: identifying a first Qualitative Level of Service (QLoS) of a first network that a User Equipment (UE) is connected to for data transmission; identifying a second QLoS of a second network that the UE is not connected to for data transmission; and in response to determining that a difference between the first QLoS and the second QLoS satisfies a handoff threshold, requesting a first access point in the first network to initiate handoff of the UE to a second access point in the second network, wherein handoff disconnects the UE from the first network for data transmission and connects the UE to the second network for data transmission.

One embodiment presented in this disclosure is a system that includes: a processor; and a memory including instructions that when executed by the processor perform an operation comprising: identifying a first Qualitative Level of Service (QLoS) of a first network that the system is connected to for data transmission; identifying a second QLoS of a second network that the system is not connected to for data transmission; and in response to determining that a difference between the first QLoS and the second QLoS satisfies a handoff threshold, requesting a first access point in the first network to initiate handoff of the system to a second access point in the second network, wherein handoff disconnected the system from the first network for data transmission and connects the system to the second network for data transmission.

EXAMPLE EMBODIMENTS

In a wirelessly networked environment, various devices of User Equipment (UE) are connected via various standards to Access Points (APs) according to various Radio Access Technology (RAT) types. These APs provide connectivity to the UE, but due to the various standards and technologies used by those APs, different conditions may exist under which one connection can be considered "better" than the other. For example, consider a UE connected to a first network with a Received Signal Strength Indication of −70 dBm (decibels per milliWatt) with the potential to connect to a second network with an RSSI of −60 dBm. Although the first network has a weaker signal than the second network in the present example, the UE may experience faster or less lossy connection on the first network compared to the second network due to the first network including more robust error correction, the number of devices competing for available bandwidth, a higher data throughput rate, a larger coverage area, etc. Accordingly, the present disclosure provides for greater control by the UE and/or the AP over than handoff criteria between networks to increase/maximize the network connectivity of the UE.

Figure 1:
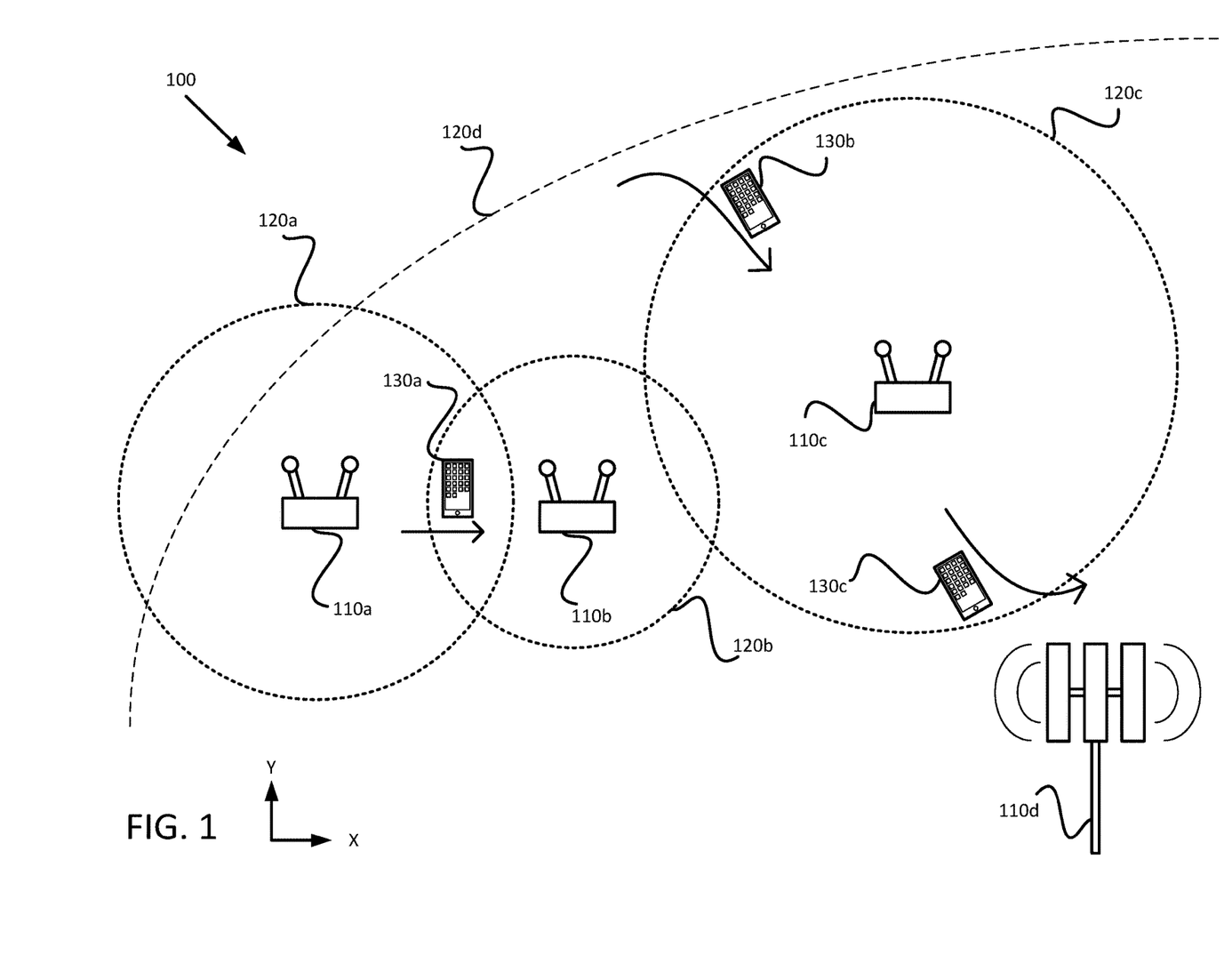
FIG. 1 illustrates an example networking environment, according to embodiments of the present disclosure.

FIG. 1 illustrates an example networking environment 100, according to embodiments of the present disclosure. In the networking environment 100, four APs 110a-d (generally, AP 110) provide four corresponding wireless networks 120a-d (generally, network 120). Several mobile devices, referred to herein as UE 130a-c (generally, UE 130), are shown moving through the network environment 100, and may transition from one network 120 to another network 120 as the UE 130 move within or out of range of a given network 120.

The APs 110 may include various networking devices configured to provide wireless networks 120 according to various networking standards or RATs (e.g., IEEE 802.11 or "WiFi" networks, BLUETOOTH® networks, "cellular" (including various generations and subtypes thereof, such as Long Term Evolution (LTE) and Fifth Generation New Radio (5G NR)) networks, Citizens Broadband Radio Service (CBRS) networks, proprietary networks). Example hardware as may be included in an AP 110 is discussed in greater detail in regard to FIG. 5. The networks 120 are illustrated according to a range in the environment 100 in which an uplink or downlink RSSI, Signal to Noise Ratio (SNR), or other network/signal metric satisfies a predefined threshold. The APs 110 offer the various UE 130 within the range of the associated network 120 network connectivity for various services including voice communication (e.g., telephony services), text communication (e.g., paging functionality, short message service (SMS), multimedia message service (MMS)), and data transmission (e.g., wireless internet access).

Various networks 120 are illustrated in FIG. 1 as neighboring one another. As used herein, networks 120 are considered to neighbor one another when at least a portion of the range of one network 120 borders or overlaps the range of the other network 120. For example, the fourth network 120d is illustrated as a neighbor of the first through third networks 120a-c, and the second network 120b neighbors the first network 120a and the third network 120c, but the first network 120a does not neighbor the third network 120c. The range of a given network 120 may vary from the range of other networks 120 in the environment 100 based on various characteristics of the associated AP 110, including an antenna configuration, a number of antennas, a broadcast power, obstructions in the environment, the proximity to other APs 110 or signal sources, a number of UE 130 connected thereto, etc.

Each of the networks 120 may be provided by different entities, and are not necessarily in communication with one another. For example, the fourth AP 110d may be a cellular tower operated by a cellular telecommunications company, and the first through third APs 110a-c may be offered by different businesses in a retail space, different persons in an apartment complex, or by a municipality offering wireless access throughout a district, as well as other deployment scenarios. Accordingly, a given UE 130 may be within range of a given network 120, but may have full, reduced, or no access to that given network 120. Additionally, a UE 130 may be connected to two networks for different purposes, such as, for example, the first UE 130a can be connected to the second network 120b to receive data (e.g., internet access) while simultaneously being connected to the fourth network 120d for telecommunications services (e.g., via telephone or text messaging services).

The UE 130 may include any computing device that is configured to wirelessly connect to one or more networks 120 in the environment 100. Example UEs 130 include, but are not limited to: smart phones, feature phones, tablet computers, laptop computers, desktop computers, Internet of Things (IoT) devices, and the like. Example hardware as may be included in a UE 130 is discussed in greater detail in regard to FIG. 5.

Figure 2A:
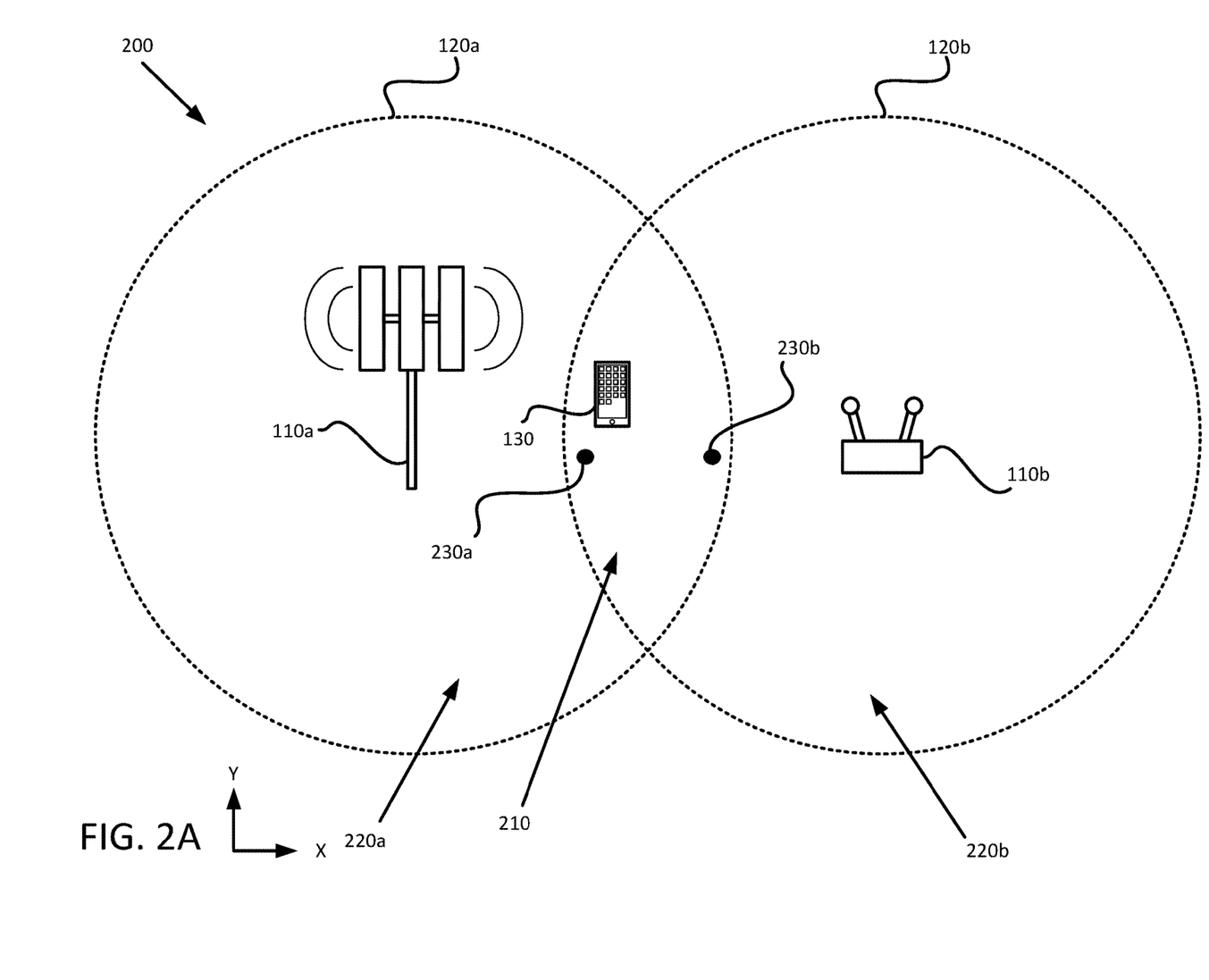
FIGS. 2A and 2B illustrate handoff scenarios, according to embodiments of the present disclosure.
Figure 2B:
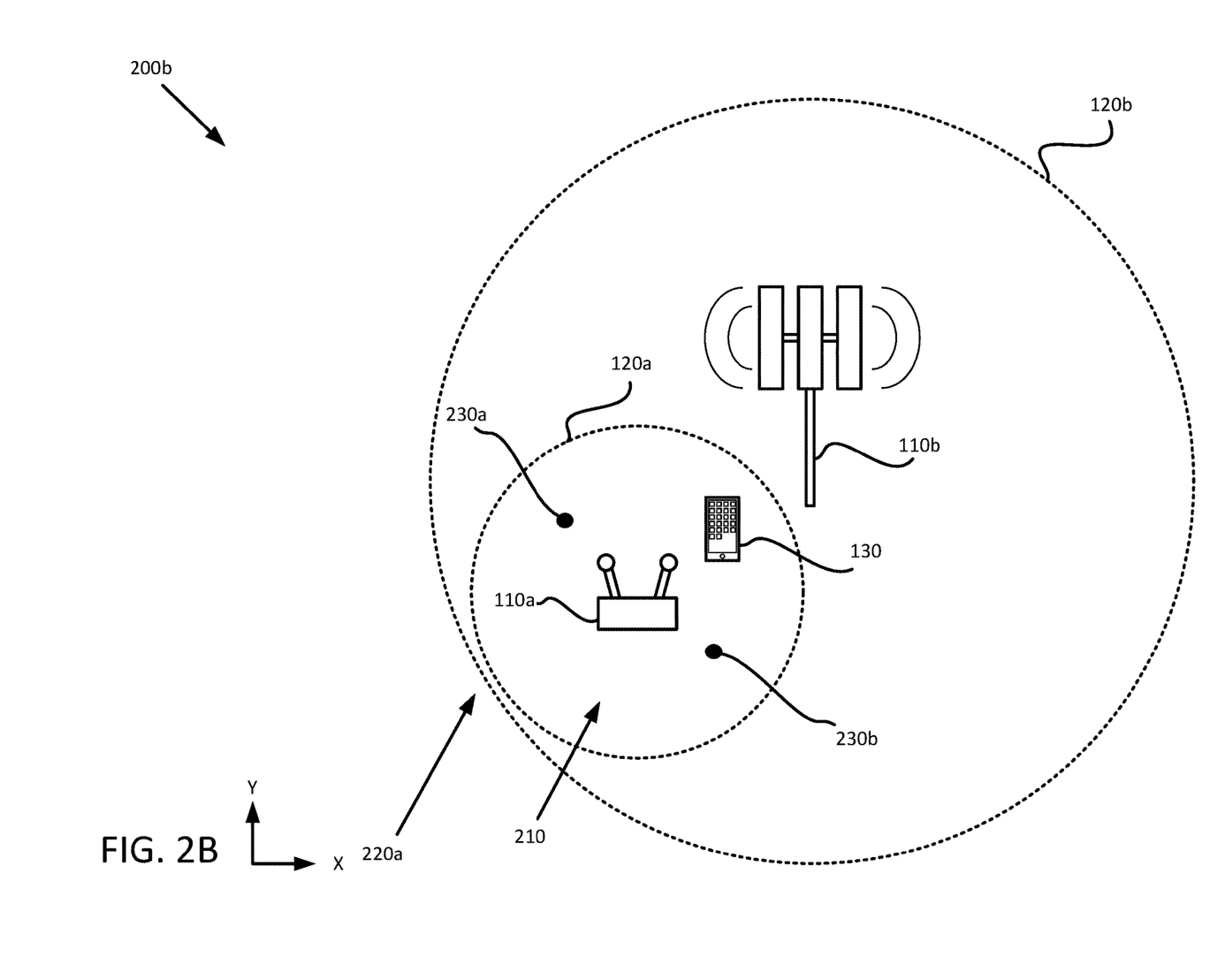

FIG. 2A illustrates a first handoff scenario 200a (generally handoff scenario 200), according to embodiments of the present disclosure. FIG. 2B illustrates a second handoff scenario 200b, according to embodiments of the present disclosure.

In the examples given in relation to the illustrated handoff scenarios 200a-b, the UE 130 is described as initially being connected to the first AP 110a for wireless data transmission over the first network 120a. The second AP 110b and the second network 120b are provided as a potential handoff target for data transmissions for the UE 130. In the handoff scenarios 200a-b, a UE 130 is in the range of a first network 120a provided by a first AP 110a and in the range of a second network 120b provided by a second AP 110b of a different RAT type. In one example, the first network 120a is a cellular communications network (e.g., a 4G or 5G network) and the second network is a WiFi network (e.g., using one of the 802.11 family of standards). In another example, the first network 120a is a WiFi network and the second network 120b is a cellular communications network. The UE 130 is connected to the first network 120a, and may potentially connect to the second network 120b (and disconnect from the first network 120a) to handover service from the first AP 110a to the second AP 110b.

As will be understood, a cellular communications network can offer multiple networking connectivity formats to a UE 130. For example, a cellular communications network can offer telecommunications connectivity (e.g., for voice calls and text messages) as well as data transmission (e.g., for Internet access via Transmission Control Protocol/Internet Protocol (TCP/IP) or other protocols). Therefore, in one example, when handing off services for data transmission from a first AP 110a to a second AP 110b, the UE 130 may be initially connected to the first AP 110a for data communications and to the second AP 110b for telecommunications connectivity. In another example, when handing off services for data transmission from a first AP 110a to a second AP 110b, the UE 130 may be initially connected to the first AP 110a for data communications and for telecommunications connectivity and after handoff remains connected to the first AP 110a for telecommunications connectivity. Stated differently, the handoff for data transmissions can be made independently of what AP 110 the UE 130 is connected to for telecommunications services.

In the first handoff scenario 200a, the range of second network 120b partially overlaps the range of the first network 120a, resulting in an overlapped zone 210 between the two networks 120a-b as well as respective first and second exclusive zones 220a-b (generally, exclusive zone 220) where each network 120 is not overlapped by the other network 120.

In the second handoff scenario 200b, the range of the second network 120b completely overlaps the range of the first network 120a, resulting in an overlapped zone 210 between the two networks 120a-b that coincides with the range of the first network 120a (i.e., no exclusive zones 220).

To affect a smooth handoff from the first network 120a to the second network 120b, the UE 130 should initiate handoff when in the overlapped zone 210—attempting to handoff while in an exclusive zone 220 may result in dropped communications. A UE 130 can identify overlapped zones 210 based on being able to receive two or more network identifiers at the same location. In some instances, a UE 130 in an overlapped zone 210 may determine to initialize a handoff based on decreasing signal strength from the first network 120a in conjunction with increasing signal strength from the second network 120b.

The UE 130, however, can also determine to not initialize a handoff when in an overlapped zone 210. For example, if remaining connected to the first network 120a provides better service to the UE 130 than connecting to the second network 120b, the UE 130 should remain connected to the first network 120a. Consider a first location 230a and a second location 230b both located in the overlapped zone 210, but with the first location 230a being located closer to the first AP 110a than the second AP 110b, and the second location 230b being located closer to the second AP 110b than the first AP 110a. In this example, if the UE 130 were located at the first location 230a, the UE 130 may receive a better signal from the first AP 110a than from the second AP 110b, and if the UE 130 were located at the second location 230b would receive a better signal from the second AP 110b than from the first AP 110a.

The APs 110 and UE 130, therefore, can communicate with one another to identify when the UE 130 is located in the overlapped zone 210 at a position in the environment where handoff would be advantageous to the UE 130. In some embodiments, the UE 130 receives network capacity information from the first AP 110a to help determine locally when to initiate a handoff to the second AP 110b. In some embodiments, the first AP 110a receives network signaling information from the UE 130 to determine when to recommend to the UE 130 to begin handoff.

The networking data transmitted from the UE 130 to the first AP 110a can include data including, but not limited to: a network type of the second AP 110b, a signal scale value, and a network identifier or other indicator of network identity.

The network type identifies the RAT of the second AP 110b, which can include identifiers for unknown network types, cellular networks, WiFi networks, etc. Types of cellular networks can include: 2G (second generation) networks such as GPRS, EDGE, and CDMA; 3G (third generation) networks such as UMTS, EVDO, HSDPA, HSUPA, and HSRPD; 4G (fourth generation) networks such as, and 5G (fifth generation) networks; among other network types used for cellular telecommunications, including voice and data. Types of WiFi networks can include various versions of IEEE 802.11 and related families of wireless local area networking. Other network RAT types are also envisioned to be identified by the network identifiers.

The signal scale provides a qualitative measure of the signal quality of the second network 120b divided into several discrete categories. For example, the signal quality of the second network 120b may be classed as "unknown/no signal", "very poor", "poor", "acceptable", "good", "very good" or the like, rather than as a SNR, RSSI, uplink/downlink bandwidth, or other quantitative measure of signal quality. Because different RAT types can different levels of reliability or data throughput under the same SNR, RSSI, or other quantitative measure of network strength, the qualitative measures of signal quality can yield a better understanding of which network 120 can provide better communications coverage to the UE 130 based on several metrics. The various qualitative measures are harmonized across different RAT types so that the UE 130 or first AP 110a can determine what constitutes a "better" (or "worse") signal quality in the second network 120b relative to the first network 120a and when to recommend or request handoff to the second network 120b.

In one example, until the qualitative levels of two neighboring networks 120 are different, the UE 130 should remain connected to the first network 120a. For example, when both the first network 120a and the second network 120b are classified as "acceptable" or "poor" or "good", there is no signal-based reason to hand off from the first network 120a to the second network 120b. Accordingly, if the first network 120a is determined to have the same or a better qualitative level of service than a second network 120b, the UE 130 may determine to not handoff to the second network 120b.

As will be appreciated, user preferences may affect the signal-based reasoning so that a UE 130 can connect to a "worse" network 120 or wait to connect to a "better" network 120 until another condition is satisfied For example, a user can specify different gaps between qualitative levels at which to initiate a handoff between different network types so that a preferred network type is connected to more often or for longer (e.g., WiFi preferred over cellular networks) or to reduce the number of handoffs back and forth between networks 120 in an area with variable network coverage. Consider then a five-tiered qualitative schema ("unknown/no signal", "very poor", "poor", "acceptable", "good", "very good") on which a user prefers to use a personally owned WiFi AP 110 and WiFi network 120 with a weaker signal rather than a cellular network 120 offered by a telecommunications service provider with a stronger signal. In this scenario, the UE 130 would connect to or stay connected to the WiFi network 120 even when the cellular network 120 is known to provide a better signal and quality of service until the difference between the signal quality is significant (e.g., non-adjacent quality levels) or the WiFi signal is lost. In another example, a user can specify that a second handoff is not to occur (absent a manual override or complete loss of signal) for at least N seconds (to thereby reduce the overhead associated with handoffs) despite a difference in signal quality between two available networks 120. In another example, a handoff between two networks 120 may be delayed based on a current or pending download, such as when a handoff would interrupt or disrupt a prioritized stream of data that handoff is delayed until the download is complete or a sufficiency buffer is accumulated to avoid disruption.

The network identifier provides an (at least partially) anonymized identification to track and compare several networks 120 against one another. As APs 110 may be associated with various globally unique identifiers (GUID), such as, for example, serial numbers, Global System for Mobile Communications cell identifiers (GSM Cell ID), etc. However, knowledge that a given UE 130 is/was connected to a specific AP 110 in the world may raise privacy concerns for a user if such information is tracked and made available to third parties. Therefore, the network identifier can represent a subset of the GUID of an AP 110 to uniquely identify and distinguish neighboring networks 120 to the first network 120a. For example, the network identifier can identify N out of M characters/bits of the GUID (e.g., the last six of the sixteen bits of a GSM cell ID) so that the first AP 110a can uniquely identify each of the other networks 120, but a third party cannot specifically identify those networks 120. The number and specific locations from which the subset of identifying characters are drawn from the GUID can vary in different embodiments (e.g., the last n bits, the first m bits, the evenly numbered bit, bits 1-2 and n-m, etc.) and may be selected based to avoid collisions between two or more neighboring networks 120 sharing a same anonymized identifier (e.g., more characters decreases the odds of a naming collision).

Because an operator of an AP 110 may have interests in retaining, removing, or receiving a UE 130 on an associated network 120 that conflict with the interests of the operator of a different AP 110 or with the user of the UE 130, the present disclosure provides for the UE 130 to retain control over whether to initiate handoff, rather than a local exchange or AP-driven solution determining whether handoff should occur. The UE 130 and the AP 110 can directly exchange information, and the APs 110 can recommend whether to initiate handoff, but the decision remains under the control of the UE 130.

Figure 3:
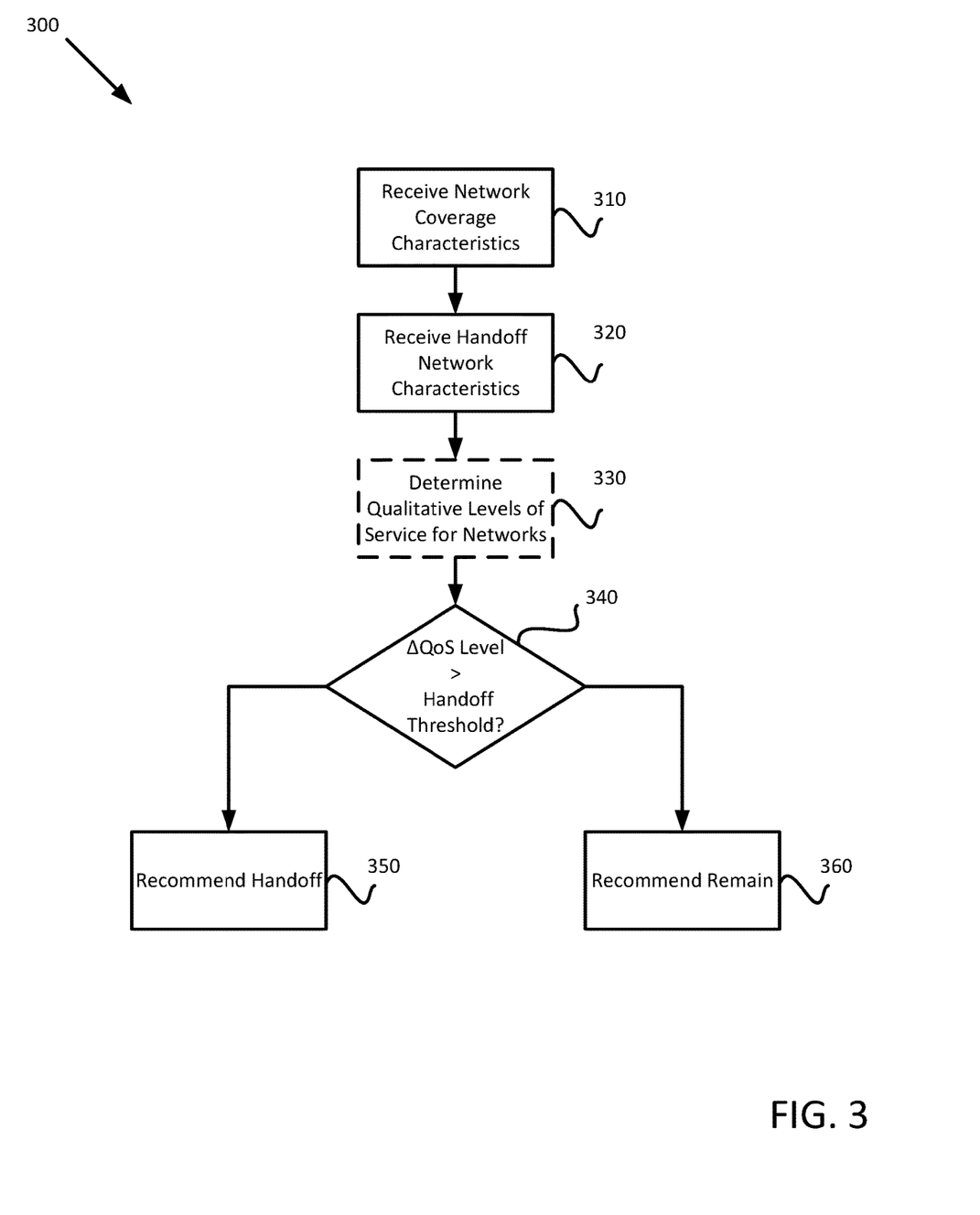
FIG. 3 is a flowchart of a method that employs handoff assist when identifying whether to recommend handoff from a first network to a second network, according to embodiments of the present disclosure.

FIG. 3 is a flowchart of a method 300 that employs handoff assist when identifying whether to recommend handoff from a first network 120*a* to a second network 120*b*, according to embodiments of the present disclosure. Although the determination of whether to initiate a handoff can ultimate rest with the UE 130, an AP 110 may have a broader view of the networking environment 100 than a particular UE 130 does. For example, several UEs 130 can report networking conditions at several locations in the environment to the AP 110 while a single UE 130 can only observe the networking conditions at the given location of that UE 130. Therefore, an AP 110 can assist in the handoff determination by recommending, based on greater environmental knowledge, whether a particular UE 130 remains connected to the current AP 110 or initiates handoff to a new AP 110, while still leaving the determination to request handoff under the control of the UE 130.

At block 310 a first AP 110*a* receives network coverage characteristics from a UE 130 that is connected to the first network 120*a* (provided by the first AP 110*a*) for data transmission (e.g., TCP/IP connectivity over WiFi or a cellular data service). In various embodiments, the UE 130 may also be connected to the first AP 110*a* for telecommunication services (voice telephony, text messages, pager services, etc.). The network coverage characteristics reported back to the first AP 110*a* can include signal strength indicators (e.g., RSSI, SNR, dropped packet rate) observed by the UE 130, a location of the UE 130 (e.g., GPS coordinates), communications standard or use case for data requested by the UE 130 (e.g., streaming video, webpages, email), channel used by the UE 130, networking hardware and software capabilities of the UE 130, etc.

At block 320 the first AP 110*a* receives network coverage characteristics from the UE 130 for a candidate handoff network, generally identified as a second network 120*b* provided by a second AP 110*b*, although the UE 130 can report several different networks 120 and associated APs 110 as candidate handoff networks. In various embodiments, the UE 130 may also be connected to the second AP 110*b* for telecommunication services, but is connected to the first AP 110*a* for data transmission services. The network coverage characteristics reported back to the first AP 110*a* can include signal strength indicators (e.g., RSSI, SNR, dropped packet rate) observed by the UE 130, a location of the UE 130 (e.g., GPS coordinates), communications standard or use case for data requested by the UE 130 (e.g., streaming video, webpages, email), channel used by the UE 130, networking hardware and software capabilities of the UE 130, the RAT type of the second AP 110*b*, an (anonymized) identifier for the second network 120*b*, etc.

These network coverage characteristics received in block 310 and block 320 may be associated and combined with various network coverage characteristics known to the AP 110 for the particular UE 130 (e.g., time connected to the first network 120*a*) as well as characteristics reported by other UEs 130 in the environment (e.g., a heatmap of signal strength for the first network 120*a*, overlap zones 210 of neighboring networks 120).

At block 330 the first AP 110*a* (optionally) determines the Qualitative Level of Service (QLoS) for the first network 120*a* and the second network 120*b* based on the reported network coverage characteristics and the RAT types of the first AP 110*a* and the second AP 110*b*. In some embodiments, network coverage characteristics received in block 310 and block 320 are pre-formatted by the UE 130 to a shared scale to identify a QLoS for each of the networks 120 rather than a raw signal strength indication, in which case block 330 may be omitted. Stated differently, the first QLoS and the second QLoS are calibrated to a shared scale across the different RAT types for the two networks 120.

When determining the QLoS for each network 120, the first AP 110*a* determines what level (e.g., "no service", "poor", "adequate", "good", "very good") the given RAT type provides to a UE 130 at for a given set of observed signal strength characteristics. In some embodiments, the signal strength characteristics are mapped to various levels of qualitative service based on a machine learning classification of what signal strength characteristics correspond to a given level of service. As different RAT types have different service levels at different signal strengths, the shared scale for evaluating different networks 120 allows for a common comparison across RAT types and that mitigates small/periodic fluctuations in signal strength resulting in needless handoffs of service. For example, a first network 120*a* and a second network 120*b* may be associated with different SNR levels, but the resulting service at the associated SNRs may be the same (e.g., both rate as "good"), or the more noise resilient RAT type can be associated with a lower SNR, but a "better" QLoS. Each of the levels may be associated with a descriptor as well as a sequential numerical rating (e.g., "very good"=4, "good"=3, "adequate"=2, etc.) for purposes of comparison between networks 120 and/or storage in memory.

At block 340 the first AP 110*a* determines whether a difference between the first QLoS and the second QLoS (i.e., $\Delta$QLoS) satisfies a handoff threshold. In various embodiments, the handoff threshold is satisfied when the second network 120*b* is associated with a higher QLoS than the first QLoS associated with the first network 120*a* (e.g., $QLoS_2 - QLoS_1 > 0$). In some embodiments, the handoff threshold is satisfied when the second QLoS is equal to or greater than the first QLoS (e.g., $QLoS_2 - QLoS_1 \geq 0$), such as when the second network 120*b* is a preferred network type for data transmission (e.g., WiFi versus cellular). In some embodiments, when the first network 120*a* is a preferred network type for data transmission, the handoff threshold is satisfied when the second QLoS is much greater than the first QLoS (e.g., $QLoS_2 - QLoS_1 > 1$ (i.e., $\gg 0$)). In some embodiment, the first AP 110*a* averages $\Delta$QLoS over time to identify and filter out edge cases where the signal strength causes the QLoS of one network 120 to vacillate between one of two levels and thereby delay a handoff recommendation until the $\Delta$QLoS settles into a steady state of satisfying or not satisfying the handoff threshold.

When the handoff threshold is satisfied in block 340, method 300 proceeds to block 350, where the first AP 110*a* transmits a handoff recommendation to the UE 130 to recommend handoff from the first network 120*a* to the second network 120*b*. In various embodiments, the UE 130 may ignore a handoff recommendation and remain connected to the first network 120*a*, request handoff in response to the handoff recommendation, or use the handoff recommendation in conjunction with an on-device determination process for whether to request handoff, such as is discussed in relation to FIG. 4.

When the handoff threshold is not satisfied in block 340, method 300 proceeds to block 350, where the first AP 110*a* either transmits a remain recommendation to the UE 130 to recommend remaining connected to the first network 120*a* or does not transmit a handoff recommendation (which the UE 130 can interpret the lack thereof as a remain recommendation). In various embodiments, the UE 130 may ignore a remain recommendation and request handoff to the second network 120*b*, remain connected in response to the handoff recommendation, or use the remain recommendation in conjunction with an on-device determination process for whether to request handoff, such as is discussed in relation to FIG. 4.

Figure 4:
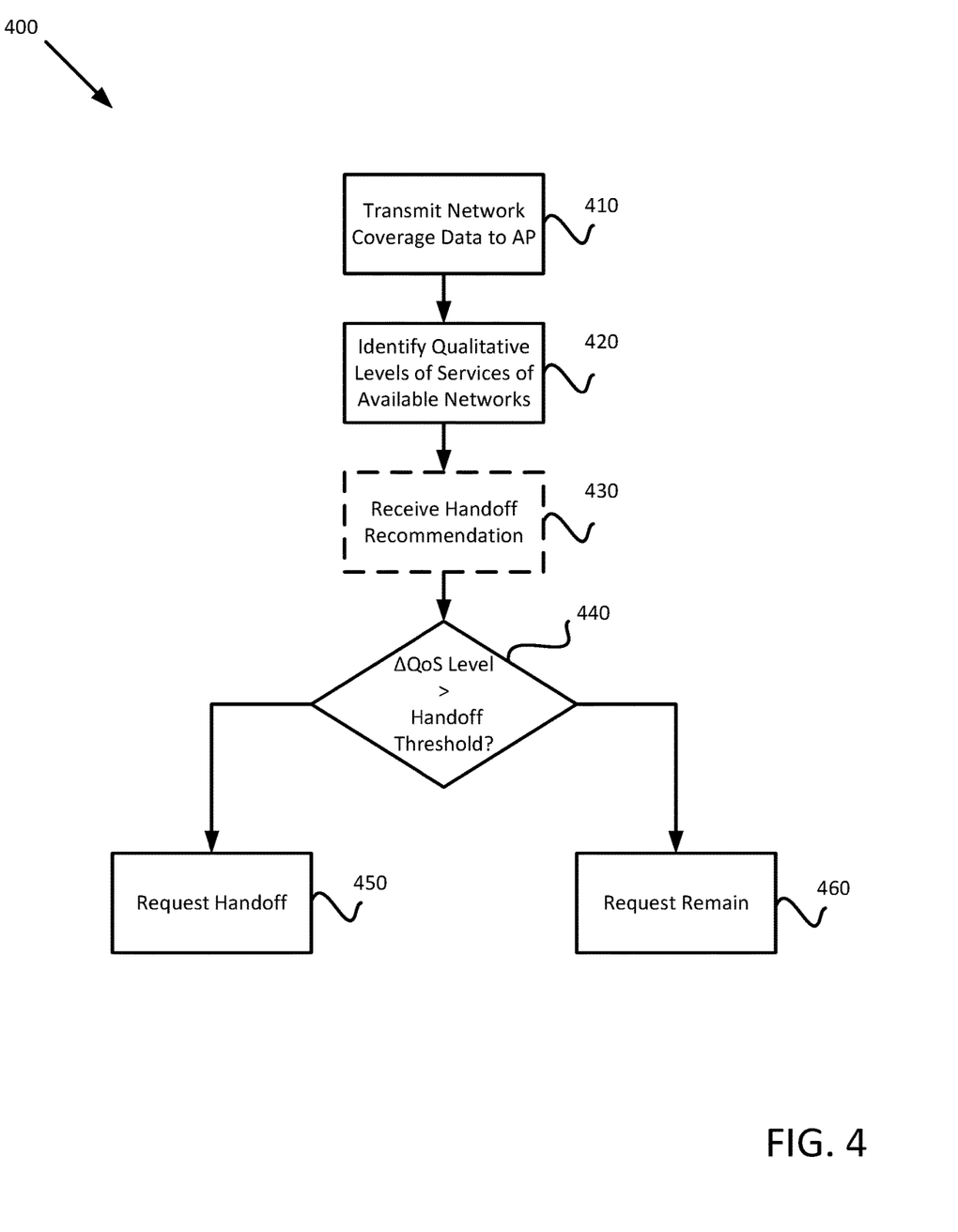
FIG. 4 is a flowchart of a method that employs handoff assist when identifying whether to request handoff from a first network to a second network, according to embodiments of the present disclosure.

FIG. 4 is a flowchart of a method 400 that employs handoff assist when identifying whether to request handoff from a first network 120*a* to a second network 120*b*, according to embodiments of the present disclosure. In various embodiments, the UE 130 performs method 400 in conjunction with a first AP 110*a* (to which the UE 130 is currently connected for data transmission services) performing method 300 (described in relation to FIG. 3), but the UE 130 can also perform method 400 without input from the first AP 110*a* or the first AP 110*a* performing method 300.

At block 410 a UE 130 transmits network coverage characteristics to a first AP 110*a* that provides a first network 120*a* to which the UE 130 is currently connected for data transmission (e.g., TCP/IP connectivity over WiFi or a cellular data service). In various embodiments, the UE 130 may also be connected to the first AP 110*a* for telecommunication services (voice telephony, text messages, pager services, etc.). The network coverage characteristics reported back to the first AP 110*a* can include signal strength indicators (e.g., RSSI, SNR, dropped packet rate) observed by the UE 130, a location of the UE 130 (e.g., GPS coordinates), communications standard or use case for data requested by the UE 130 (e.g., streaming video, webpages, email), channel used by the UE 130, networking hardware and software capabilities of the UE 130, etc.

The network characteristics can also include the signal strength indicators for neighboring networks 120 to the first network 120*a* that are visible to the UE 130 and can include signal strength indicators (e.g., RSSI, SNR, dropped packet rate) observed by the UE 130, a location of the UE 130 (e.g., GPS coordinates), communications standard or use case for data requested by the UE 130 (e.g., streaming video, webpages, email), channel used by the UE 130, networking hardware and software capabilities of the UE 130, the RAT type of the second AP 110*b*, an (anonymized) identifier for the second network 120*b*, etc. In various embodiments, the UE 130 may also be connected to the second AP 110*b* for telecommunication services, but is connected to the first AP 110*a* for data transmission services.

At block 420 the UE 130 identifies the QLoS for the various networks 120 visible to the UE 130 based on the reported network coverage characteristics and the RAT types of the APs 110 providing the associated networks 120. When determining the QLoS for each network 120, the UE 130 determines what level (e.g., "no service", "poor", "adequate", "good", "very good") the given RAT type provides to the UE 130 for a given set of observed signal strength characteristics. In some embodiments, the signal strength characteristics are mapped to various levels of qualitative service based on a machine learning classification of what signal strength characteristics correspond to a given level of service. As different RAT types have different service levels at different signal strengths, the shared scale for evaluating different networks 120 allows for a common comparison across RAT types and that mitigates small/periodic fluctuations in signal strength resulting in needless handoffs of service. For example, a first network 120*a* and a second network 120*b* may be associated with different SNR levels, but the resulting service at the associated SNRs may be the same (e.g., both rate as "good"), or the more noise resilient RAT type can be associated with a lower SNR, but a "better" QLoS. Each of the levels may be associated with a descriptor as well as a sequential numerical rating (e.g., "very good"=4, "good"=3, "adequate"=2, etc.) for purposes of comparison between networks 120 and/or storage in memory. Accordingly an AP 110 associated with a lower quality of service can have a higher signal strength than an AP 110 associated with a higher quality service based on the differences between RAT types differ, and the UE 130 can identify and distinguish when an improvement in the quality of service can be achieved by handing off to a new network 120.

At block 430 the UE 130 optionally receives a recommendation from the first AP 110*a* to request a handoff from a first network 120*a* to a second network 120*b*. In various embodiments, the UE 130 can use the recommendation from the first AP 110*a* over a locally made determination whether to initiate handoff, can ignore the recommendation, or can use the recommendation in conjunction with the locally made determination. For example, when a recommendation is received, the UE 130 may use a more different threshold for handoff (e.g., handing off more often when the AP 110 also recommends handoff than when such a recommendation is not received).

At block 440 the UE 130 determines whether a difference between the first QLoS and the second QLoS (i.e., $\Delta$QLoS) satisfies a handoff threshold. In various embodiments, the handoff threshold is satisfied when the second network 120*b* is associated with a higher QLoS than the first QLoS associated with the first network 120*a* (e.g., $QLoS_2 - QLoS_1 > 0$). In some embodiments, the handoff threshold is satisfied when the second QLoS is equal to or greater than the first QLoS (e.g., $QLoS_2 - QLoS_1 \geq 0$), such as when the second network 120*b* is a preferred network type for data transmission (e.g., WiFi versus cellular). In some embodiments, when the first network 120*a* is a preferred network type for data transmission, the handoff threshold is satisfied when the second QLoS is much greater than the first QLoS (e.g., $QLoS_2 - QLoS_1 > 1$ (i.e., $\gg 0$)). In some embodiment, the UE 130 averages $\Delta$QLoS over time to identify and filter out edge cases where the signal strength causes the QLoS of one network 120 to vacillate between one of two levels and thereby delay a handoff recommendation until the $\Delta$QLoS settles into a steady state of satisfying or not satisfying the handoff threshold.

When the handoff threshold is satisfied in block 440, method 400 proceeds to block 450, where the UE 130 requests that the first AP 110*a* begin handoff procedures to the second AP 110*b* providing the second network 120*b* to connect to.

When the handoff threshold is not satisfied in block 440, method 400 proceeds to block 450, where the UE 130 requests to remain connected to the first AP 110*a* by either no transmitting a handoff request to the first AP 110*a* or otherwise indicating that a handoff is not currently desired (e.g., transmitting a remain request or an acknowledgement and dismissal of a handoff recommendation.

Figure 5:
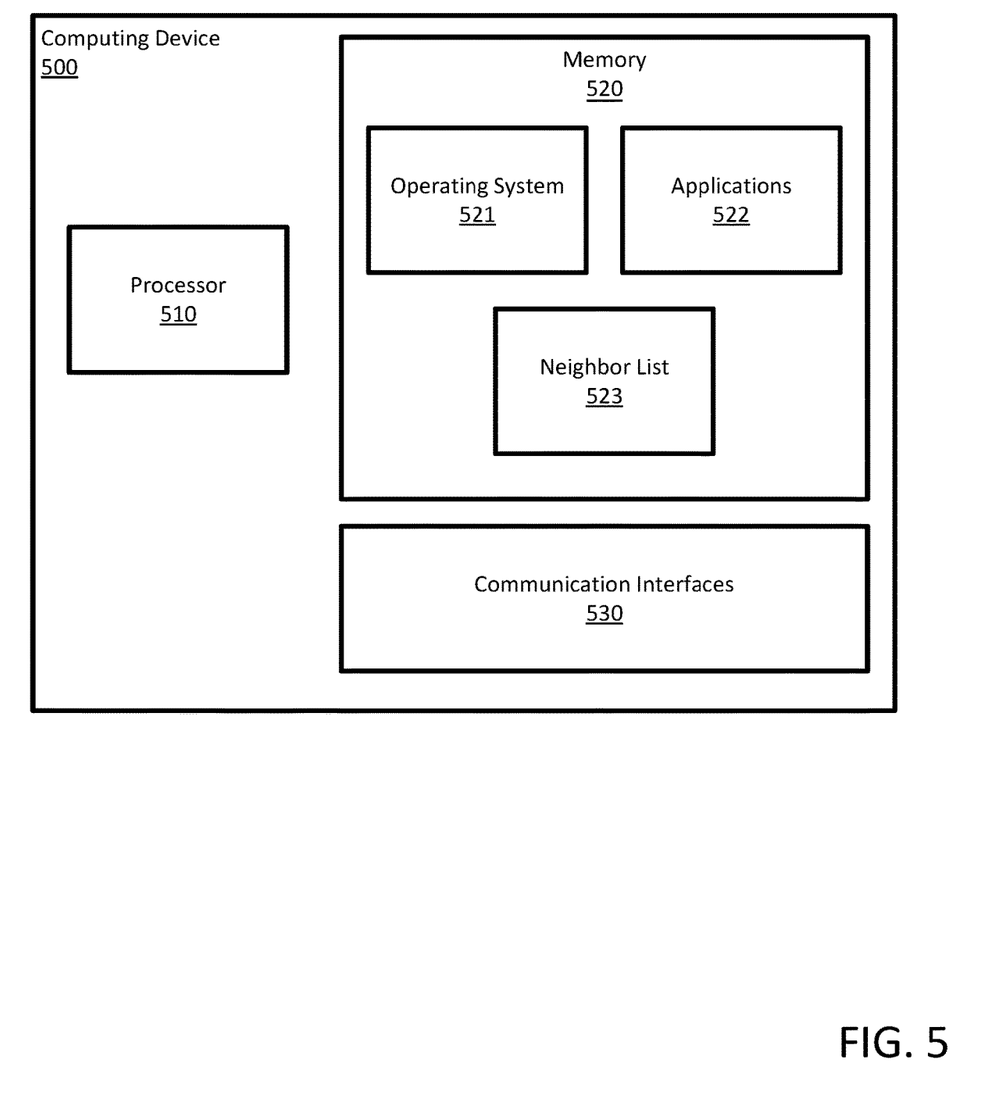
FIG. 5 illustrates hardware of a computing device, according to embodiments of the present disclosure.

FIG. 5 illustrates hardware of a computing device 500, as may be used in an AP 110 or a UE 130 described in the present disclosure. The computing device 500 includes a processor 510, a memory 520, and communication interfaces 530. The processor 510 may be any processing element capable of performing the functions described herein. The processor 510 represents a single processor, multiple processors, a processor with multiple cores, and combinations thereof. The communication interfaces 530 facilitate communications between the computing device 500 and other devices. The communications interfaces 530 are representative of wireless communications antennas and various wired communication ports. The memory 520 may be either volatile or non-volatile memory and may include RAM, flash, cache, disk drives, and other computer readable memory storage devices. Although shown as a single entity, the memory 520 may be divided into different memory storage elements such as RAM and one or more hard disk drives.

As shown, the memory 520 includes various instructions that are executable by the processor 510 to provide an operating system 521 to manage various functions of the computing device 500 and one or more applications 522 to provide various functionalities to users of the computing device 500, which include one or more of the functions and functionalities described in the present disclosure. Additionally, the memory 520 includes one or more neighbor lists 523 containing the identities and networking conditions associated with various networks 120 currently, previously, or potentially visible as neighbors with a currently-connected-to or provided network 120. For example, a UE 130 may maintain a neighbor list 523 for a first network 120a to identify the networking conditions of a second network 120b and a third network 120c that the first network knows to be neighbors, but the UE 130 may not currently observe (e.g., reporting network characteristics of "unknown" or "no signal") to enable a first AP 110a to learn where overlapped zones 210 and exclusive zones 220 in the first network 120a are located. In another example, an AP 110 can use the received networking characteristics from several UE 130 received over time to develop a heatmap or other understanding of the associated network's signaling characteristics and the signaling characteristics of any neighboring networks 120 observed by those UE 130.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:
   receiving, at a first Access Point (AP) of a first Radio Access Technology (RAT) type part of a first wireless network, a location of a User Equipment (UE) that is currently connected to the first wireless network;
   receiving, at the first AP from the UE, a network coverage characteristics for the UE that identify:
   a first signal strength metric of the first wireless network for the UE;
   an identity of a second AP part of a second wireless network, to which the UE is not connected, wherein the second AP is a second RAT type different than the first RAT type; and
   a second signal strength metric of the second wireless network for the UE;
   determining a first qualitative level of service of the first wireless network for the UE based on the location, the first signal strength metric of the first wireless network as observed by the UE, and the first RAT type;
   determining a second qualitative level of service of the second wireless network for the UE based on the location, the second signal strength metric of the second wireless network as observed by the UE on a shared scale with the first signal strength metric, and the second RAT type;
   wherein the first qualitative level of service and the second qualitative level of service are calibrated to the shared scale across RAT types;
   wherein the first qualitative level of service indicates a lower quality of service than the second qualitative level of service on the shared scale despite the a first signal strength metric indicating a higher quality of service than the second signal strength metric based on differences between the first RAT type and the second RAT type; and
   in response to a difference between the first qualitative level of service and the second qualitative level of service satisfying a threshold, transmitting a handoff recommendation to the UE to disconnect from the first wireless network and connect to the second wireless network.

2. The method of claim 1, wherein the handoff recommendation is ignored by the UE based on a preference setting a different threshold on the UE than the threshold used by the first AP.

3. The method of claim 1, wherein each of the first signal strength metric and the second signal strength metric include at least one of:
   a signal to noise ratio;
   an uplink received signal strength indicator; and
   a downlink received signal strength indicator.

4. The method of claim 1, wherein the first qualitative level of service indicates a lower quality of service than the second qualitative level of service despite the a first signal strength metric indicating a higher quality of service than the second signal strength metric based on differences between the first RAT type and the second RAT type.

5. The method of claim 1, wherein the first wireless network is a WiFi network and the second wireless network is a cellular network that the UE is connected to for telecommunication services.

6. The method of claim 1, wherein first wireless network is a cellular network that the UE is connected to for telecommunication services and data transmission services and the second wireless network is a WiFi network identified as a handoff candidate for the data transmission services.

7. A method, comprising:
   identifying a first Qualitative Level of Service (QLoS) of a first network that a User Equipment (UE) is connected to for data transmission;
   identifying a second QLoS of a second network that the UE is not connected to for data transmission;
   wherein the first QLoS and the second QLoS are based on:
   a signal strength metric of an associated network as observed by the UE; and
   a RAT type of the associated network; and
   wherein the first QLoS and the second QLoS are calibrated to a shared scale across RAT types; and
   wherein the first QLoS indicates a lower quality of service on the shared scale than the second QLoS despite a first signal strength metric for the first network indicating a higher quality of service than a second signal strength metric for the second network based on differences between a first RAT type for the first network and a second RAT type for the second network; and
   in response to determining that a difference between the first QLoS and the second QLoS satisfies a handoff threshold, requesting a first access point in the first network to initiate handoff of the UE to a second access point in the second network, wherein handoff disconnects the UE from the first network for data transmission and connects the UE to the second network for data transmission.

8. The method of claim 7, wherein the first network is of a cellular network Radio Access Technology (RAT) type and the second network is of a WiFI RAT type, and wherein the UE is initially connected to the first network for data transmission and for telecommunication services and remains connected to the first network for the telecommunication services after handoff.

9. The method of claim 7, wherein the first network is of a WiFi RAT type and the second network is of a cellular network RAT type, and wherein the UE is initially connected to the second network for telecommunication services and remains connected to the second network for telecommunication services after handoff.

10. The method of claim 7, wherein the UE reports networking conditions to a first Access Point (AP) providing the first network.

11. The method of claim 7, further comprising:
in response to receiving a handoff recommendation from a first AP providing the first network, selecting the handoff threshold based on the handoff recommendation.

12. A system, comprising:
a processor; and
a memory including instructions that when executed by the processor perform an operation comprising:
identifying a first Qualitative Level of Service (QLoS) of a first network that the system is connected to for data transmission;
identifying a second QLoS of a second network that the system is not connected to for data transmission;
wherein the first QLoS and the second QLoS are based on:
a signal strength metric of an associated network as observed by the system; and
a RAT type of the associated network; and
wherein the first QLoS and the second QLoS are calibrated to a shared scale across RAT types; and
wherein the first QLoS indicates a lower quality of service on the shared scale than the second QLoS despite a first signal strength metric for the first network indicating a higher quality of service than a second signal strength metric for the second network based on differences between a first RAT type for the first network and a second RAT type for the second network; and
in response to determining that a difference between the first QLoS and the second QLoS satisfies a handoff threshold, requesting a first access point in the first network to initiate handoff of the system to a second access point in the second network, wherein handoff disconnected the system from the first network for data transmission and connects the system to the second network for data transmission.

13. The system of claim 12, wherein the first network is of a cellular network Radio Access Technology (RAT) type and the second network is of a WiFI RAT type, and wherein the system is initially connected to the first network for data transmission and for telecommunication services and remains connected to the first network for the telecommunication services after handoff.

14. The system of claim 12, wherein the first network is of a WiFi RAT type and the second network is of a cellular network RAT type, and wherein the system is initially connected to the second network for telecommunication services and remains connected to the second network for telecommunication services after handoff.

15. The system of claim 12, wherein the system reports networking conditions to a first Access Point (AP) providing the first network.

16. The system of claim 12, wherein, in response to receiving a handoff recommendation from a first AP providing the first network, the system is configured to select the handoff threshold based on the handoff recommendation.

* * * * *

UNITED STATES PATENT AND TRADEMARK OFFICE
CERTIFICATE OF CORRECTION

PATENT NO. : 11,166,217 B2  
APPLICATION NO. : 16/601363  
DATED : November 2, 2021  
INVENTOR(S) : Malcolm M. Smith et al.

Page 1 of 1

It is certified that error appears in the above-identified patent and that said Letters Patent is hereby corrected as shown below:

On the Title Page

Item (74), in Column 2, in "Attorney, Agent or Firm", Line 1, delete "Shendan," and insert -- Sheridan, --, therefor.

In the Specification

In Column 1, Line 27, after "AP" insert -- . --.

In the Claims

In Column 13, Line 60, in Claim 1, delete "the a" and insert -- a --, therefor.

In Column 14, Line 16, in Claim 4, delete "the a" and insert -- a --, therefor.

In Column 14, Line 60, in Claim 8, delete "WiFI" and insert -- WiFi --, therefor.

In Column 16, Line 14, in Claim 13, delete "WiFI" and insert -- WiFi --, therefor.

Signed and Sealed this  
Twenty-eighth Day of December, 2021

Drew Hirshfeld  
*Performing the Functions and Duties of the*  
*Under Secretary of Commerce for Intellectual Property and*  
*Director of the United States Patent and Trademark Office*